United States Patent [19]
Hollmann

[11] Patent Number: 5,889,830
[45] Date of Patent: Mar. 30, 1999

[54] COOLING SYSTEM FOR COOLING A CONTAINMENT CHAMBER CONSTRUCTED FOR RECEIVING A CORE MELT

[75] Inventor: Josef Hollmann, Schlüsselfeld, Germany

[73] Assignee: Siemens Aktiengesellschaft, Munich, Germany

[21] Appl. No.: 881,087

[22] Filed: Jun. 23, 1997

Related U.S. Application Data

[63] Continuation of PCT/DE95/01823 Dec. 20, 1995 published as WO96/20485 Jul. 4, 1996.

[30] Foreign Application Priority Data

Dec. 23, 1994 [DE] Germany .......................... 44 46 421.5

[51] Int. Cl.⁶ .................................................. G21C 9/016
[52] U.S. Cl. ............................ 376/280; 376/284; 376/285
[58] Field of Search .................................... 376/280, 282, 376/284, 285

[56] References Cited

U.S. PATENT DOCUMENTS 5,343,506 8/1994 Artnik et al. ........................... 376/280

FOREIGN PATENT DOCUMENTS

| 0390486A2 | 10/1990 | European Pat. Off. . |
| 0419159A2 | 3/1991 | European Pat. Off. . |
| 4041295A1 | 7/1992 | Germany . |
| 4337367A1 | 12/1994 | Germany . |

OTHER PUBLICATIONS

Japanese Patent Abstract No. 6130169 (Hiroaki et al.), dated May 13, 1994.

Japanese Patent Abstract No. 5072372 (Tasuku), dated Mar. 26, 1993.

*Primary Examiner*—Daniel D. Wasil
*Attorney, Agent, or Firm*—Herbert L. Lerner; Laurence A. Greenberg

[57] ABSTRACT

A nuclear power plant has a reactor core and a containment chamber for receiving core melt of the reactor core. A cooling system for cooling the containment chamber includes a flooding container to be filled with coolant fluid. A cooling pipe leads from the flooding container to the containment chamber. A passively opening closure element closes the cooling pipe in the flooding container and opens as a function of a level of the coolant fluid.

14 Claims, 4 Drawing Sheets

COOLING SYSTEM FOR COOLING A CONTAINMENT CHAMBER CONSTRUCTED FOR RECEIVING A CORE MELT

CROSS-REFERENCE TO RELATED APPLICATION

This application is a Continuation of International Application Serial No. PCT/DE95/01823 published as WO96/20485 Jul. 4, 1996.

BACKGROUND OF THE INVENTION

FIELD OF THE INVENTION

The invention relates to a cooling system having a cooling pipe for cooling a containment chamber that serves to receive core melt of a reactor core of a nuclear power plant.

In order to provide safe operation, nuclear power plants have numerous diverse and redundant safety systems, including cooling systems, through the use of which operating conditions that deviate from normal operating conditions can be detected early and counteracted. As a result, such safety-critical states as reactor core meltdown are practically precluded.

In order to control that kind of accident, which is considered hypothetical, German Published, Non-Prosecuted Patent Application DE 40 41 295 A1, corresponding to U.S. Pat. No. 5,343,506, describes a core retainer and a method for emergency cooling of a nuclear power plant. The core retainer has a catch basin, which is disposed immediately below the reactor pressure vessel that encloses the reactor core. Both the catch basin and the reactor pressure vessel are disposed inside a reactor cavern, which is a concrete structure. Cooling channels extend along the floor and the walls of the catch basin between the catch basin and the concrete structure and coolant water can be carried through the cooling channels. The cooling channels on the floor communicate with a water supply and discharge into a cooling pipe that protrudes in siphonlike fashion into the water supply. The siphonlike cooling pipe includes one part shaped as an inverted U. The apex of the U is located above an operative level of the water supply, and although the cooling pipe does dip into the water supply, in the vicinity of its apex it protrudes out of the water supply. As a result, as long as the level is at the operative level, no coolant water enters the cooling channels. It is not until the water supply is flooded to a level higher than the apex of the U that coolant water enters the cooling channels, resulting in cooling of the outside of the catch basin. Cooling of the interior of the catch basin is carried out through a flood pipe, which is passed from the water supply through the concrete structure into the catch basin. The flood pipe is closed in the catch basin by a meltable stopper that does not melt open until at a high ambient temperature, thus allowing coolant water to flow into the interior of the catch basin. Coolant water is present in the flood pipe even during normal operation of the nuclear power plant, and as a result the meltable stopper is continuously cooled.

SUMMARY OF THE INVENTION

It is accordingly an object of the invention to provide a cooling system for cooling a retention or containment chamber constructed for receiving a core melt, which overcomes the hereinafore-mentioned disadvantages of the heretofore-known devices of this general type and which initiates cooling of a catch basin by passive measures and therefore inherently safely.

With the objects of the invention in view, there is also provided a cooling system for cooling a containment chamber for receiving core melt of a reactor core of a nuclear power plant, comprising a flooding container to be filled with coolant fluid; a cooling pipe leading from the flooding container to the containment chamber; and a passively opening closure element closing the cooling pipe in the flooding container and opening as a function of a level of the coolant fluid.

Through the use of a closure element that opens as a function of the level of the coolant fluid, it is assured that cooling of the containment chamber will not ensue by feeding of coolant fluid into the flooding container until a safety-critical state exists. The coolant fluid that additionally flows into the flooding container is preferably primary coolant water, which emerges from the primary coolant loop of the reactor core during the safety-critical state. Coolant fluid can optionally be fed into the flooding container through a separate coolant fluid reservoir. The cooling pipe is closed until the closure element opens and therefore is free of water. As a result, during normal operation of the nuclear power plant, coolant fluid and particularly coolant water is kept away from the containment chamber, thus averting such problematic factors as corrosion from coolant water or unintended cooling of a temperature-dependent closure element that closes the cooling pipe. Moreover, the inherent safety of the nuclear power plant is improved by the passively opening closure element, and human error in initiating cooling of the containment chamber is precluded.

In accordance with another feature of the invention, the closure element is a float that closes off the cooling pipe. At an operative level of the coolant water, this float has such buoyancy that it sealingly closes the cooling pipe, for instance through a ball seat. The float is preferably movable along a primary axis in a guide, so that unintended slippage of the float from its sealing seat is avoided even upon the occurrence of jarring of the kind that can be caused by earthquakes, for instance.

In accordance with a further feature of the invention, the float has an interior that can be filled with coolant fluid. A filler pipe passing into this interior has an inlet opening for coolant fluid, through which the coolant fluid flows in if a flooding level occurs that rises above an operative level. The inlet opening may be located geodetically above the operative level or geodetically below this operative level. In the latter case, the filler pipe is extended from the inlet opening in a U above the operative level, so that an apex of the inverted U is located above the operative level. In this latter case as well, coolant fluid does not flow into the interior of the float until the operative level has been exceeded by a predeterminable amount. Coolant fluid flowing into the interior lessens the buoyancy of the float, so that beyond a certain fill level of the interior, the float leaves its sealing seat, thereby opening the cooling pipe. Cooling of the cooling pipe thus ensues in a passive way.

In accordance with an added feature of the invention, the float has a condensed water suction removal device, by which condensed water that occurs can be removed by suction during a normal operative state of the nuclear power plant. As a result, lowering of the float from the occurrence of condensed water and an attendant unintentional initiation of cooling of the containment chamber are reliably avoided.

In accordance with an additional feature of the invention, the containment chamber communicates with the flooding container through a return for coolant fluid that extends geodetically above the cooling pipe, and in particular above the operative level. This return is closed in the flooding container by a further closure element that opens as a function of the level. Internal cooling of the containment chamber by a coolant fluid loop is attained through the use of the return. Coolant fluid flowing from the flooding container to the containment chamber flows in natural circulation. This assures that during a safety-critical state of the nuclear power plant, sufficient coolant fluid is returned to the flooding container, and cooling of the containment chamber and in particular of the core melt received in the containment chamber occurs.

In accordance with yet another feature of the invention, the closure element that closes the return to the flooding container and which may also be a float, has a ball valve. This ball valve may have a floatable ball, which is held in a sealing position by a guide path. The ball valve protects the closure element from a pressure wave which can occur, for instance, from a temperature increase inside the containment chamber. If coolant water flows out of the containment chamber into the return, the ball of the ball valve floats upward and thereby opens the return to the flooding container.

In accordance with yet a further feature of the invention, the cooling pipe is a flood pipe, which discharges into the containment chamber and thereby assures direct cooling particularly of the surface of any core melt that has flowed into the containment chamber. The flood pipe preferably extends horizontally and can be both installed and removed by working from the flooding container. Installing the flood pipe in the containment chamber from the flooding container has the advantage of permitting the mounting to be provided outside the containment chamber, which may be poorly accessible and might be affected by radiation. This is especially favorable in the case of a containment chamber that surrounds the reactor core, since this installation can be carried out after the containment chamber is lined in the usual way with a crucible-like guard and collection layer.

In accordance with yet an added feature of the invention, during normal operation of the nuclear power plant, the flood pipe is closed in the containment chamber with a closure element that opens as a function of temperature. During normal operation of the nuclear power plant, it is filled with air, and as a result the closure element that opens as a function of temperature is thermally insulated from the coolant water of the flooding container, and coolant water does not enter the flood pipe until during a safety-critical state of the nuclear power plant, so that the effects of corrosion are reliably avoided.

As a result of the thermal insulation of the closure element that opens as a function of temperature, reliable opening, and in particular melting open, in the event of major heat development inside the containment chamber, are assured. The closure element that opens as a function of temperature can therefore be constructed in such a way that it opens the flood pipe only at high temperatures as compared with a closure element that is in direct contact with coolant water. The closure element that opens as a function of temperature is preferably resistant to neutron radiation, which occurs during normal operation of the nuclear power plant in the immediately vicinity of the reactor core and particularly in the reactor cavern that receives the reactor pressure vessel. Moreover, it has the advantage of using only a single melting element (melting screw, melting strip), so that canting and thus belated opening of the closure element as would occur if there were a plurality of elements melting at different times, is averted. The closure element is furthermore adapted to the cross section of the flood pipe, so that installation of the flood pipe with the closure element already assembled is assured.

In accordance with yet an additional feature of the invention, the closure element that opens as a function of temperature has a material that melts open at a high temperature, for instance above 900° C. This material may be corrosion-resistant and radiation-resistant and in particular may be silver. The closure element that opens as a function of temperature may have a bale closure with a silver tightening screw. The bale closure presses a cap sealingly into the flood pipe, so that this flood pipe is closed with certainty during normal operation of the nuclear power plant.

In accordance with again another feature of the invention, the closure element that opens as a function of temperature can alternatively have a closure cap that is sealingly soldered to the flood pipe. Silver can also be used as the soldering substance.

In accordance with again a further feature of the invention, the containment chamber has an external cooling device for externally cooling at least a floor and/or one wall of the containment chamber. The cooling pipe is a supply line connecting the external cooling device to the flooding container. During normal operation of the nuclear power plant, the supply line is closed by a float. The external cooling device preferably has a drain line for the coolant fluid, which returns to the flooding container. As a result, coolant fluid, in particular primary coolant water that has flowed into the flooding container, returns to the flooding container again, so that a coolant loop is provided for the external cooling of the containment chamber.

In accordance with again an added feature of the invention, the containment chamber is a crucible-like catch basin disposed below the reactor core. Cooling of the catch basin, which ensues passively by a float disposed in the flooding container, takes place on the outside of the catch basin by the external cooling device and/or in the interior of the catch basin through the use of a flood pipe.

Preferably, a flood pipe is extended thermally elastically from the flooding container to the catch basin, discharging into the latter. The flood pipe has a compensator outside the catch basin, in particular between the wall of the catch basin and a concrete structure that forms a reactor cavern. The compensator, which in particular is welded on and has a welded-on spherical flange, seals off the catch basin that has an interior with a temperature of approximately 300° C., for instance, from the external cooling of the catch basin, which has a temperature of 20° C. to 30° C. The compensator serves to compensate for thermal expansions of the catch basin and additionally assures sealing off of the flood pipe from a coolant fluid flow for cooling the outer wall of the catch basin.

In accordance with a concomitant feature of the invention, the cooling system is also suitable for cooling a propagation chamber located laterally below the reactor core. The interior of the propagation chamber may be cooled by a flood pipe, which extends from a flooding container into the propagation chamber. External cooling of the propagation chamber by suitably extended cooling channels, which are flooded with coolant fluid through a passively opening closure element, such as a float, inside the flooding container, is also possible.

Other features which are considered as characteristic for the invention are set forth in the appended claims.

Although the invention is illustrated and described herein as embodied in a cooling system for cooling a containment chamber constructed for receiving a core melt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The figures of the drawings show an exemplary embodiment of a containment chamber of the invention that is a crucible-like catch basin but is analogously applicable to a containment chamber constructed as a propagation chamber.

Figure 1:
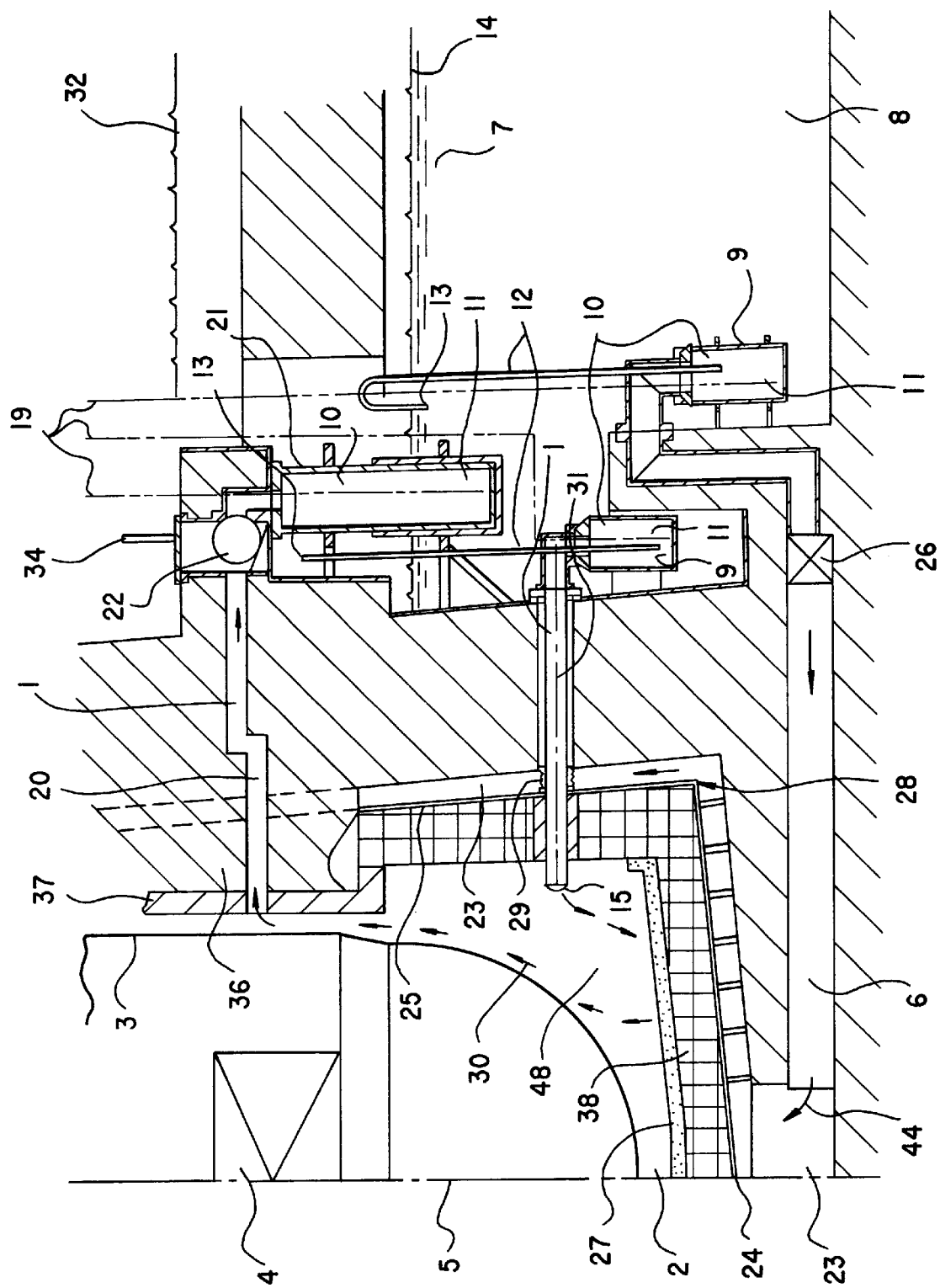
FIG. 1 is a fragmentary, diagrammatic, longitudinal-sectional view of a nuclear power plant.

Referring now in detail to the figures of the drawings, in which identical reference numerals identify identical components, and first, particularly, to FIG. 1 thereof, there is seen a fragmentary, longitudinal section through a nuclear power plant having a cooling system 1 for cooling a containment or retention chamber 2 constructed to receive core melt. A reactor pressure vessel 3 which is largely rotationally symmetrical about its primary axis 5 is disposed in a reactor cavern 48 formed by a supporting structure 36. The reactor pressure vessel 3 contains a reactor core 4. The containment chamber 2 is formed in the reactor cavern 48 below the reactor pressure vessel 3 through the use of a catch basin 28 for a core melt. The catch basin 28 has a floor 24 and a wall 25. A free space remains between the support structure 36 on one hand and the wall 25 and the floor 24 on the other hand, for an external cooling device 23 of the catch basin 28. In the interior of the catch basin 28, the floor 24 and the wall 25 are adjoined by a lining 38, for instance of zirconium oxide (ZrO$_2$) tiles. A layer of sacrificial concrete 27, especially for lowering the melting point of a core melt, is disposed on the lining 38 toward the floor 24. A cooling pipe 6 for coolant fluid 7 is constructed as a flood pipe 31 which passes from a flooding container 8 through both the wall 25 and the adjoining support structure 36, with a slight inclination from the horizontal, into the catch basin 28. In the catch basin 28, the flood pipe 31 is closed by a closure element 15, in particular a closure element that opens as a function of temperature. In the flooding container 8, the flood pipe 31 is closed by a closure element 9 that opens as a function of a fluid level and in particular has a float 10. A compensator 29 which surrounds the flood pipe 31 between the wall 25 and the support structure 36, seals off the wall 25 from the external cooling device 23 and absorbs thermal expansion of the catch basin 28. The float 10 that seals the flood pipe 31 has an interior 11. A filler pipe 12, which has an inlet opening 13 geodetically above the flood pipe 31, is introduced into the interior 11. The inlet opening 13 is likewise located above an operative level 14 of the coolant fluid 7, in particular coolant water, that is located in the flooding container. The external cooling device 23 of the catch basin 28 communicates with the flooding container 8 through a supply line 26 that extends through the support structure 36 substantially horizontally below the reactor cavern 48. In the flooding container 8, the supply line 26 is likewise closed by a closure element 9 having a float 10. The closure element 9 of the supply line 26 also has a filler pipe 12 which extends into the interior 11 of the float 10, leads out of the coolant fluid 7 above the operative level 14 and is bent back in a U to enter the coolant fluid 7 again, where it ends in an inlet opening 13. A return 20 for internal cooling which is disposed above the operative level 14 and thus above the flood pipe 31, extends from the reactor cavern 48 into the flooding container 8. Inside the flooding container 8, this return 20 is closed by a further closure element 21, which has a further float 10 that is immersed approximately halfway into the coolant water 7. A ball valve 22 with a float ball is disposed between the further closure element 21 and the return 20. Each of the closure elements 9, 21 has a respective condensed water suction removal device 19. The return 20 extends in the reactor cavern 48 above the catch basin 28 through both the support structure 36 and an insulation 37 adjoining the support structure 36. The return 20 communicates with the interior of the catch basin 28.

During normal operation of the nuclear power plant, the cooling system 1, which includes the external cooling device 23, the flood pipe 31, the return 20 and the closure elements 9, 21, 15, is closed. In particular, both the external cooling device 23 and the flood pipe 31 are filled with air. During normal operation of the nuclear power plant, the external cooling device 23 serves the purpose of operative air cooling, which prevents heating up of the support structure. Cooling air is fed from below through airshafts that are located outside the support structure 36, into the supply line 26, which is constructed as an annular channel and communicates with eight horizontal channels, to the outside of the catch basin 28. The cooling air rises on the outside of the catch basin 28 and the support structure 36 as it heats up and can escape into a non-illustrated reactor building of the nuclear power plant. The annular channel likewise communicates through eight pipes with the flooding container 8. During an accident involving melting of the reactor core 4, the flooding container 8 is flooded with additional coolant fluid, in particular coolant water 7, so that the level rises from the operative level 14 to an elevated level that is located above the inlet opening 13 of the float 10. The additional coolant fluid in this case is primary coolant water emerging from the primary coolant loop of the reactor core 4. The additional coolant fluid can optionally be fed from a separate, additional coolant fluid supply. The floats 10, which close the flood pipe 31 and the external cooling device 23, are filled with coolant water 7 and sink downward because of the decreasing buoyancy. As a result, both the flood pipe 31 and the external cooling device 23 are filled with coolant water. When the operative level 14 is exceeded, the external cooling 23 comes into operation first. A return of coolant water 7 through the external cooling device 23 takes place through six horizontally extending, non-illustrated channels above the operative level 14 into the flooding container 7. The return through the external cooling device 23 and the return 20 of the internal cooling are separate from one another. The core melt that emerges as the reactor core 4 melts down leads to heat development in the catch basin 28, as a result of which the closure element 15 of the flood pipe 31 likewise opens, since it opens as a function of temperature. As a result, the coolant fluid 7 flows into the interior of the catch basin 28 to cool the core melt. The elevated level inside the flooding container 8 thereupon drops, for instance by 30 cm to 60 cm, to a flooding level 32, so that the level of the coolant water 7 is at the same height in both the reactor cavern 48 and the flooding container 8. The coolant fluid 7 flowing into the catch basin 28 through the flood pipe 31 is heated and rises by natural circulation as is indicated by flow arrows 30 and flows back through the return 20 into the flooding container 8, as is also represented by the flow arrows 30. Opening of the closure element 9 of the external cooling device 23 causes the coolant water 7 to pass out of the flooding container 8 through the supply line 26, as is represented by flow arrows 44, so that it can reach the outside of the catch basin 28. The coolant water 7 evaporates there and is returned into the flooding container 8 through non-illustrated channels. As a result of the evaporation, cooling of the catch basin 28 from the outside occurs as well. The evaporated coolant water 7 rises inside the nuclear power plant, condenses, and passes back into the flooding container 8. Effective cooling of any core melt occurring in the catch basin 28 is assured over a long period of time through the use of the closure elements 9 for both the flood pipe 31 and the external cooling device 23, which elements open upon a rise of the level in the flooding container 8.

Figure 2:
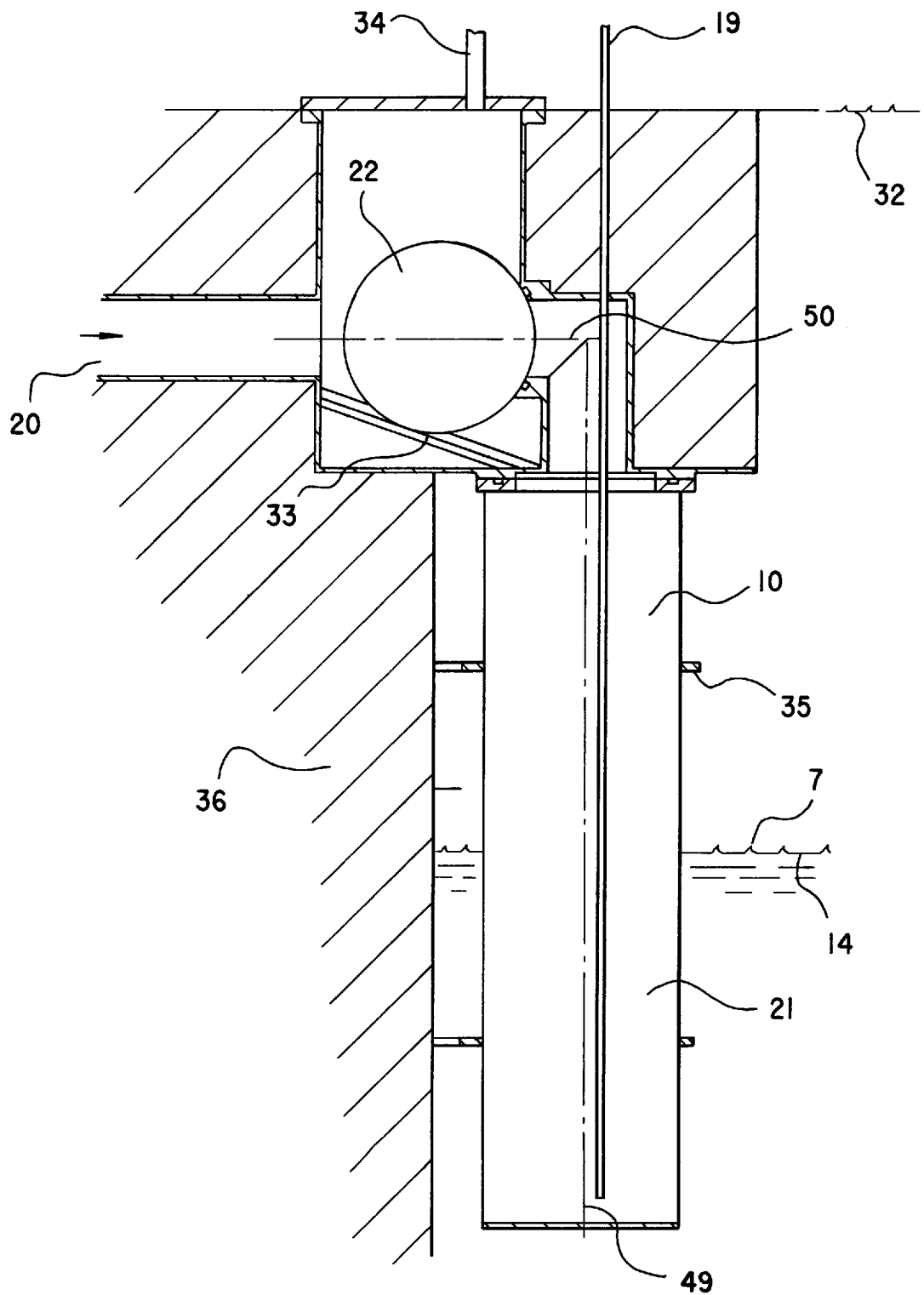
FIG. 2 is an enlarged, fragmentary, longitudinal-sectional view of a closure element in a return.

In FIG. 2, the further closure element 21 of FIG. 1, having a float 10 and a ball valve 22 with a floatable ball, is shown on a larger scale. At the operative level 14, the float 10 is immersed approximately halfway in the coolant water 7. The floatable ball of the ball valve 22 rests on a ball position holder 33 that extends downward from the return 20 to the float 10. Even in the event of a pressure wave arising in the reactor cavern 48 and propagating through the return 20, the ball valve 22 seals off the float 10, so that the float remains protected. The float 10 is guided in guides 35, and it is thus displaceable along an axis 49. The ball valve 22 has a vent 34. During a normal operating state of the nuclear power plant, the return 20 is dry and in particular is filled with air. If the level inside the flooding container 8 rises from the operative level 14 to a flooding level 32, which is located geodetically above the further closure element 21, then the coolant water 7 reaches the ball valve 22 through the return 20. After the entry of the coolant water 7 into the ball valve 22, the floatable ball rises and uncovers an opening 50, through which the coolant water 7 can flow out of the return 20 into the float 10. As a result of the inflowing coolant water 7, the buoyancy of the float 10 decreases, and it sinks along the axis 49 in the flooding container 8, and therefore the coolant water 7 can flow out of the return 20 into the flooding container 8 in natural circulation.

Figure 3:
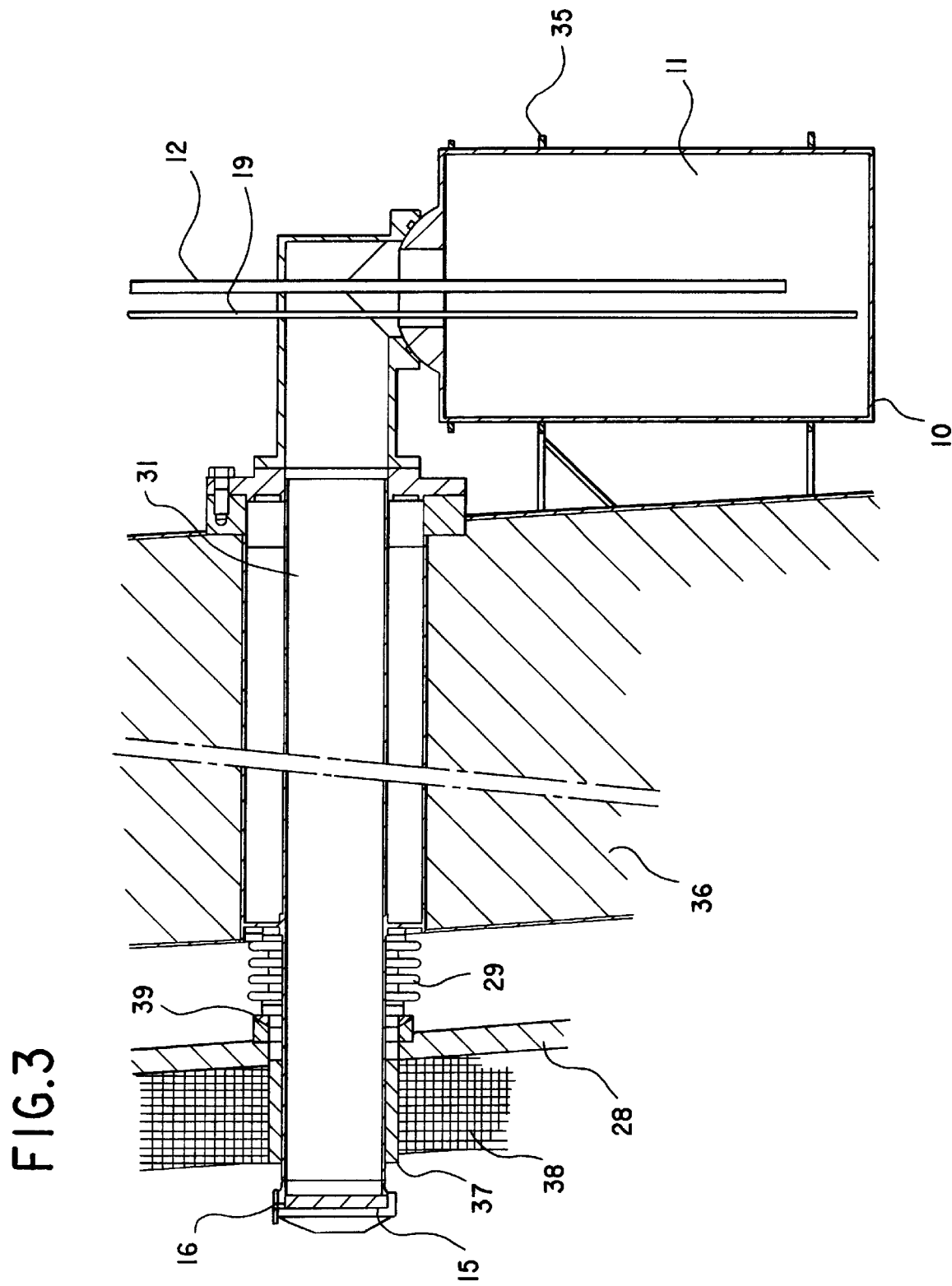
FIG. 3 is an enlarged, fragmentary, longitudinal-sectional view of a flood pipe leading from a flooding container into a catch basin.

The flood pipe 31 of FIG. 1 is shown on a larger scale in FIG. 3. Inside the catch basin 28, the flood pipe 31 is closed by the closure element 15 that opens as a function of temperature and has a bale closure 16. The flood pipe 31 is surrounded between the support structure 36 and the catch basin 28 by the compensator 29, which rests sealingly on the catch basin 28 in a ball sealing seat 38.

Figure 4:
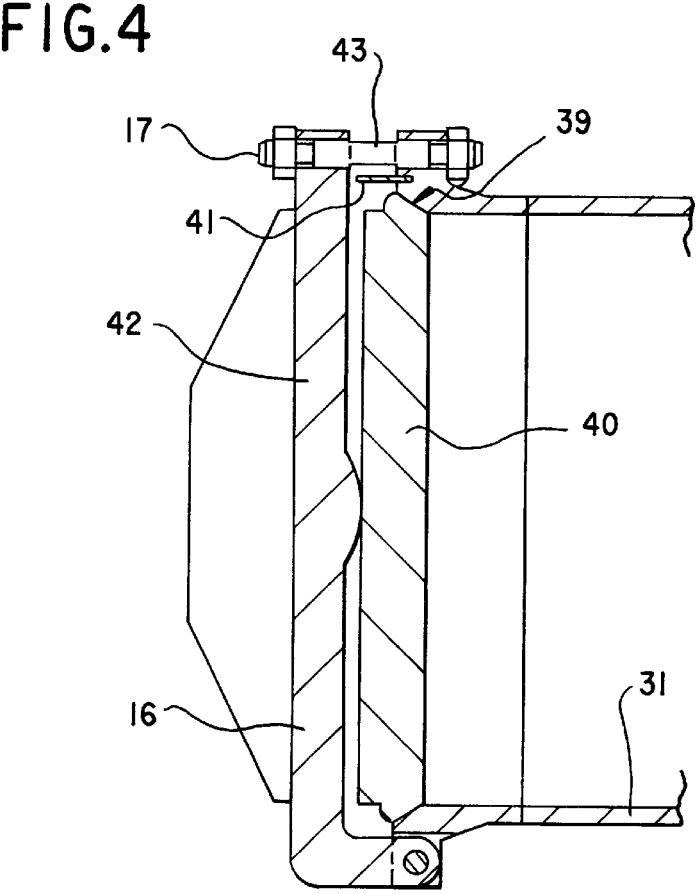
FIG. 4 is an enlarged, fragmentary, longitudinal-sectional view of a closure element of the flood pipe in the catch basin.

On a larger scale, FIG. 4 shows the closure element 15 of FIG. 3 that opens as a function of temperature. The bale or hoop closure 16 acts through a bale or hoop 42 to press a cap 40 firmly into a ball sealing seat 39 of the flood pipe 31. The bale 42 is firmly connected to the flood pipe 31 through a tightening screw 17, which has a melting bolt 43. The melting bolt 43 is formed of silver with a melting temperature of about 960° C. A splash protector 41 between the melting bolt 43 and the cap 40 is disposed parallel to the flood pipe 31, to protect the melting bolt 43 against escaping coolant water 7. As a result, it is assured that melt-through of the melting bolt 43 is not delayed by evaporating coolant water 7, even if the ball sealing seat 39 should leak.

Figure 5:
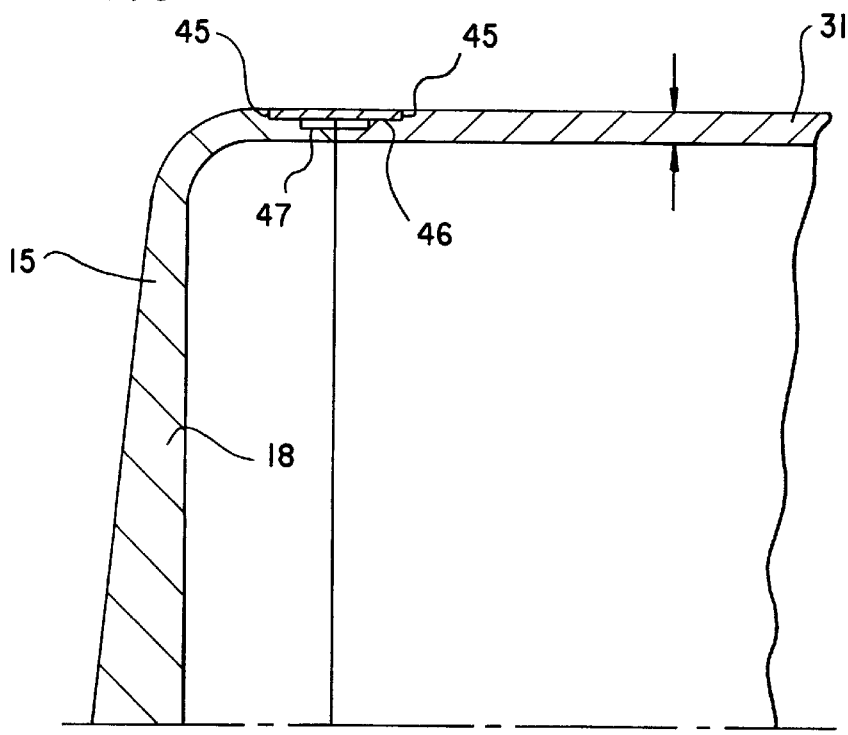
FIG. 5 is a view similar to FIG. 4 showing an alternative embodiment of the closure element of the flood pipe in the catch basin.

FIG. 5 shows an alternative embodiment of a closure element 15, which opens as a function of temperature, for the flood pipe 31. The closure element 15 has a closure cap 18, which is soldered to the flood pipe 31 at two solder strips 45 through a silver strip 46 that surrounds the flood pipe 31. An insulator 47 having an air cushion is introduced between the silver strip 46 and abutting portions of the flood pipe 31 and the closure cap 18. If high heat develops in the containment chamber 2, the solder strips 45 and if applicable the silver strip 46 melt open, so that the closure cap 18 falls off and the flood pipe 31 opens. The closure elements 15 shown in FIG. 4 and FIG. 5 each have only one melting element 43, 46. As a result, the danger of unequal melting open of two melting elements that close the closure element, with the possibility of belated opening of the closure element, is averted.

The invention is distinguished by a cooling system with a cooling pipe for cooling a containment chamber constructed to receive a core melt. The cooling is tripped through the use of a passive closure element. The closure element opens as a function of the level of coolant water in a flooding container, so that coolant water flows into the containment chamber or along its outside surfaces. The closure element preferably has a float which due to its buoyancy closes off the cooling pipe. The float is constructed in such a way that when a level of cooling water that is above an operative level is reached, the float is filled with coolant water through a filler pipe, and the cooling pipe sinks downward into the flooding container, thereby opening. The cooling system has a return that is extended above the fluid pipe that feeds coolant water into the containment chamber. Through the use of the return and the fluid pipe, a natural circulation of the coolant water develops, thereby assuring effective cooling of the containment chamber and the core melt caught therein.

I claim:

1. In a nuclear power plant having a reactor core and a containment chamber for receiving core melt of the reactor core, a cooling system for cooling the containment chamber, comprising:

a flooding container to be filled with coolant fluid;

a cooling pipe leading from said flooding container to the containment chamber; and a passively opening closure element closing said cooling pipe in said flooding container, thus interrupting a flow of the coolant fluid from said flooding container to the containment chamber and opening as a function of a level of the coolant fluid.

2. In a nuclear power plant having a reactor core and a containment chamber for receiving core melt of the reactor core, a cooling system for cooling the containment chamber, comprising:

a flooding container to be filled with coolant fluid;

a cooling pipe leading from said flooding container to the containment chamber; and a passively opening float closing off said cooling pipe in said flooding container and opening as a function of a level of the coolant fluid.

3. The cooling system according to claim 2, wherein said float has an interior to be filled with the coolant fluid, and a filler pipe extends into said interior and has an inlet opening for receiving a flow of the coolant fluid if the coolant fluid reaches a flooding level rising above an operative level.

4. The cooling system according to claim 2, wherein said float has a condensed water suction removal device.

5. The cooling system according to claim 1, including a return for the coolant fluid extending geodetically above said cooling pipe and connecting the containment chamber to said flooding container, and a further closure element closing said return in said flooding container and opening as a function of the coolant fluid level.

6. The cooling system according to claim 5, wherein said further closure element has a ball valve.

7. The cooling system according to claim 1, wherein said cooling pipe is a flood pipe discharging into the containment chamber.

8. The cooling system according to claim 7, including a closure element closing said flood pipe in the containment chamber and opening as a function of temperature.

9. The cooling system according to claim 8, wherein said closure element opening as a function of temperature is a bale closure with a tightening screw melting above 900° C.

10. The cooling system according to claim 8, wherein said closure element opening as a function of temperature is a closure cap soldered with silver.

11. The cooling system according to claim 1, wherein the containment chamber has a floor element and a wall element, and including an external cooling device for cooling at least one of said elements with the coolant fluid, said cooling pipe connecting said external cooling device to said flooding container as a supply line.

12. The cooling system according to claim 1, wherein the containment chamber is a crucible-like catch basin disposed below the reactor core.

13. The cooling system according to claim 12, wherein said cooling pipe has a compensator outside the catch basin for compensating for thermal expansions of the catch basin.

14. The cooling system according to claim 1, wherein the containment chamber is a propagation chamber disposed laterally below the reactor core.

* * * * *